US008753021B1

(12) United States Patent
Baca et al.

(10) Patent No.: US 8,753,021 B1
(45) Date of Patent: Jun. 17, 2014

(54) ADHESIVES FOR SECURING OPTICAL FIBERS TO FERRULES OF OPTICAL CONNECTORS AND METHODS FOR USE THEREOF

(71) Applicants: Adra Smith Baca, Rochester, NY (US); Steven Bruce Dawes, Corning, NY (US)

(72) Inventors: Adra Smith Baca, Rochester, NY (US); Steven Bruce Dawes, Corning, NY (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 13/765,033

(22) Filed: Feb. 12, 2013

(51) Int. Cl.
*G02B 6/36* (2006.01)
(52) U.S. Cl.
USPC ............ 385/80; 385/76; 385/77; 385/78
(58) Field of Classification Search
USPC ............................................. 385/80
See application file for complete search history.

(56) References Cited

U.S. PATENT DOCUMENTS

| 4,147,402 | A | 4/1979 | Chown | 350/96.18 |
|---|---|---|---|---|
| 4,345,930 | A | 8/1982 | Basola et al. | 65/102 |
| 4,510,005 | A | 4/1985 | Nijman | 156/221 |
| 4,678,268 | A | 7/1987 | Russo et al. | 350/96.18 |
| 4,859,827 | A | 8/1989 | Coyle, Jr. et al. | 219/121.64 |
| 4,932,989 | A | 6/1990 | Presby | 65/2 |
| 5,011,254 | A | 4/1991 | Edwards et al. | 350/96.18 |
| 5,101,090 | A | 3/1992 | Coyle, Jr. et al. | 219/121.68 |
| 5,226,101 | A | 7/1993 | Szentesi et al. | 385/85 |
| 5,256,851 | A | 10/1993 | Presby | 219/121.69 |
| 5,291,570 | A | 3/1994 | Filgas et al. | 385/78 |
| 5,317,661 | A | 5/1994 | Szentesi et al. | 385/31 |
| 5,421,928 | A | 6/1995 | Knecht et al. | 156/153 |
| 5,772,720 | A | 6/1998 | Taira-Griffin et al. | 65/387 |
| 5,954,974 | A | 9/1999 | Broer et al. | 216/2 |
| 5,966,485 | A | 10/1999 | Luther et al. | 385/85 |
| 5,991,493 | A * | 11/1999 | Dawes et al. | 385/141 |
| 6,139,196 | A | 10/2000 | Feth et al. | 385/97 |
| 6,246,026 | B1 | 6/2001 | Vergeest | 219/121.72 |
| 6,282,349 | B1 | 8/2001 | Griffin | 385/81 |
| 6,361,219 | B1 | 3/2002 | Blyler, Jr. et al. | 385/85 |
| 6,413,450 | B1 | 7/2002 | Mays, Jr. | 264/1.27 |
| 6,509,547 | B1 | 1/2003 | Bernstein et al. | 219/121.68 |
| 6,534,741 | B2 | 3/2003 | Presby | 219/121.69 |
| 6,738,544 | B2 | 5/2004 | Culbert et al. | 385/33 |
| 6,742,936 | B1 | 6/2004 | Knecht et al. | 385/67 |
| 6,774,341 | B2 | 8/2004 | Ohta | 219/121.72 |
| 6,805,491 | B2 | 10/2004 | Durrant et al. | 385/76 |
| 6,817,785 | B2 | 11/2004 | Tian | 385/96 |
| 6,822,190 | B2 | 11/2004 | Smithson et al. | 219/121.69 |

(Continued)

FOREIGN PATENT DOCUMENTS

| WO | 01/61394 A1 | 8/2001 | G02B 6/26 |
|---|---|---|---|
| WO | 01/61395 A1 | 8/2001 | G02B 6/26 |

(Continued)

*Primary Examiner* — Rhonda Peace

(57) ABSTRACT

An optical fiber may be secured to a ferrule of an optical connector with an adhesive mixture. The optical fiber may be secured by preparing an adhesive mixture, disposing the adhesive mixture in a fiber-receiving passage defining an inner surface of the ferrule, inserting the optical fiber into the fiber-receiving passage and into contact with the adhesive mixture, and curing the adhesive mixture. The adhesive mixture may be prepared by forming a base mixture that includes a base solvent, an alkyltrialkoxysilane, an aryltrialkoxysilane, and an aryltrifluorosilane. The adhesive mixture may be cured by heating to a temperature of at least about 200° C. and cooling to room temperature or below.

20 Claims, 1 Drawing Sheet

(56) References Cited

U.S. PATENT DOCUMENTS

| | | | |
|---|---|---|---|
| 6,825,440 B2 | 11/2004 | Ohta et al. | 219/121.69 |
| 6,886,991 B2 | 5/2005 | Endo | 385/78 |
| 6,888,987 B2 | 5/2005 | Sercel et al. | 385/39 |
| 6,902,327 B1 | 6/2005 | Johnson | 385/60 |
| 6,939,055 B2 | 9/2005 | Durrant et al. | 385/76 |
| 6,951,994 B2 | 10/2005 | Mays, Jr. | 219/121.67 |
| 6,955,478 B2 | 10/2005 | Durrant et al. | 385/76 |
| 6,957,920 B2 | 10/2005 | Luther et al. | 385/85 |
| 6,960,627 B2 | 11/2005 | Huth et al. | 525/59 |
| 6,963,687 B2 | 11/2005 | Vergeest et al. | 385/123 |
| 6,968,103 B1 | 11/2005 | Schroll et al. | 385/30 |
| 7,023,001 B2 | 4/2006 | Cournoyer et al. | 250/492.1 |
| 7,029,187 B2 | 4/2006 | Chapman et al. | 385/96 |
| 7,082,250 B2 | 7/2006 | Jones et al. | 385/134 |
| 7,142,741 B2 | 11/2006 | Osborne | 385/15 |
| 7,147,384 B2 | 12/2006 | Hardcastle et al. | 385/60 |
| 7,216,512 B2 | 5/2007 | Danley et al. | 65/392 |
| 7,264,403 B1 | 9/2007 | Danley et al. | 385/60 |
| 7,267,491 B2 | 9/2007 | Luther et al. | 385/85 |
| 7,306,376 B2 | 12/2007 | Scerbak et al. | 385/76 |
| 7,324,723 B2 | 1/2008 | Shioda et al. | 385/31 |
| 7,324,724 B2 | 1/2008 | Levesque et al. | 385/31 |
| 7,377,700 B2 | 5/2008 | Manning et al. | 385/72 |
| 7,419,308 B2 | 9/2008 | Ma | 385/54 |
| 7,509,004 B2 | 3/2009 | Coleman | 385/33 |
| 7,540,668 B2 | 6/2009 | Brown | 385/78 |
| 7,630,609 B1 | 12/2009 | Mays, Jr. et al. | 385/137 |
| 7,695,201 B2 | 4/2010 | Douglas et al. | 385/85 |
| 7,802,927 B2 | 9/2010 | Benjamin et al. | 385/88 |
| 8,052,836 B2 | 11/2011 | Cale et al. | 156/712 |
| 8,101,885 B2 | 1/2012 | Nakamae et al. | 219/121.77 |
| 8,104,974 B1 | 1/2012 | Gurreri | 385/72 |
| 8,109,679 B2 | 2/2012 | Danley et al. | 385/85 |
| 8,132,971 B2 | 3/2012 | Luther et al. | 385/83 |
| 2004/0234211 A1 | 11/2004 | Durrant et al. | 385/88 |
| 2005/0008307 A1 | 1/2005 | Culbert et al. | 385/123 |
| 2005/0284852 A1 | 12/2005 | Vergeest et al. | 219/121.67 |
| 2006/0137403 A1 | 6/2006 | Barr et al. | 65/377 |
| 2006/0266743 A1 | 11/2006 | Chi et al. | 219/121.69 |
| 2008/0067158 A1 | 3/2008 | Levesque | 219/121.72 |
| 2009/0023855 A1* | 1/2009 | Nakamura et al. | 524/540 |
| 2009/0062460 A1* | 3/2009 | Nakamura | 524/611 |
| 2010/0101277 A1 | 4/2010 | Gonthier et al. | 65/392 |
| 2010/0215319 A1 | 8/2010 | Childers et al. | 385/60 |
| 2010/0303416 A1 | 12/2010 | Danley et al. | 385/55 |
| 2012/0014649 A1 | 1/2012 | Duis et al. | 385/65 |
| 2012/0027356 A1 | 2/2012 | Gurreri | 385/60 |
| 2012/0027358 A1 | 2/2012 | Webb et al. | 385/78 |

FOREIGN PATENT DOCUMENTS

| | | | |
|---|---|---|---|
| WO | 01/61870 A2 | 8/2001 | |
| WO | 2004/003612 A1 | 1/2004 | G02B 6/25 |
| WO | 2008/103239 A1 | 8/2008 | B23K 26/00 |

* cited by examiner

ADHESIVES FOR SECURING OPTICAL FIBERS TO FERRULES OF OPTICAL CONNECTORS AND METHODS FOR USE THEREOF

BACKGROUND

1. Field

The present disclosure generally relates to materials and methods for adhering parts within optical connectors, and more specifically to adhesives for use in adhering optical fibers to ferrules within optical connectors, and the methods for use thereof.

2. Technical Background

In the assembly of optical connectors, adhesives may be used to bond optical fibers to ferrules. The adhesives are often thermoset resins, such as epoxies. A need exists for alternative optical fiber adhesives or optical fiber adhesives with enhanced bonding properties or otherwise improved performance.

BRIEF SUMMARY

In accordance with one embodiment of the present disclosure, an optical fiber may be secured to a ferrule of an optical connector. The method for securing the optical fiber to the ferrule may comprise preparing an adhesive mixture, disposing the adhesive mixture in a fiber-receiving passage defining an inner surface of the ferrule, inserting the optical fiber into the fiber-receiving passage and into contact with the adhesive mixture, and curing the adhesive mixture. Preparing the adhesive mixture comprises forming a base mixture that may comprise a base solvent, an alkyltrialkoxysilane, an aryltrialkoxysilane, and an aryltrifluorosilane. The adhesive mixture may be cured by heating to a temperature of at least about 200° C. and cooling to room temperature or below.

In accordance with another embodiment of the present disclosure, an adhesive may be prepared. The method for preparing the adhesive may comprise forming a base mixture, heating the base mixture to form a reacted mixture comprising an alcohol, evaporating at least a portion of the alcohol in the reacted mixture to form a resin, mixing a reconstituting solvent with the resin to reconstitute the resin into an adhesive mixture, and curing the adhesive mixture. The base mixture may comprise a base solvent, an alkyltrialkoxysilane, an aryltrialkoxysilane, and an aryltrifluorosilane. The adhesive mixture may be cured by heating to a temperature of at least about 200° C. and cooling to room temperature or below.

In accordance with yet another embodiment of the present disclosure, an optical connector may comprise a ferrule, an optical fiber, and an adhesive. The optical connector may be used for terminating the optical fiber. The ferrule may comprise a fiber-receiving passage defining an inner surface. The adhesive may be disposed within the ferrule and in contact with the inner surface of the ferrule and the optical fiber. The adhesive may comprise a cured alkyltrialkoxysilane, a cured aryltrialkoxysilane, and a cured aryltrifluorosilane.

In accordance with yet another embodiment of the present disclosure, an optical connector may comprise a fiber receiving passage, an optical fiber, and an adhesive. The optical connector may be used for terminating the optical fiber. The fiber-receiving passage may define an inner surface. The adhesive may be disposed within the fiber receiving passage and in contact with the inner surface of the fiber receiving passage and the optical fiber. The adhesive may comprise a cured alkyltrialkoxysilane, a cured aryltrialkoxysilane, and a cured aryltrifluoro silane.

Additional features and advantages of the technology disclosed herein will be set forth in the detailed description which follows, and in part will be readily apparent to those skilled in the art from that description or recognized by practicing the technology as described herein, including the detailed description which follows, the claims, as well as the appended drawings.

It is to be understood that both the foregoing general description and the following detailed description present embodiments of the technology, and are intended to provide an overview or framework for understanding the nature and character of the technology as it is claimed. The accompanying drawings are included to provide a further understanding of the technology, and are incorporated into and constitute a part of this specification. The drawings illustrate various embodiments and together with the description serve to explain the principles and operations of the technology. Additionally, the drawings and descriptions are meant to be merely illustrative, and are not intended to limit the scope of the claims in any manner.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
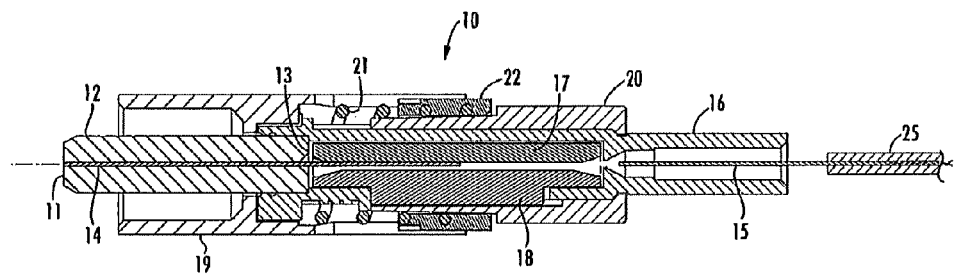
FIG. 1 is a lengthwise cross-sectional view of a conventional fiber optic mechanical splice connector to be mounted on an end portion of a field optical fiber.

Reference will now be made in greater detail to various embodiments, some embodiments of which are illustrated in the accompanying drawings. Whenever possible, the same reference numerals will be used throughout the drawings to refer to the same or similar parts. Generally, disclosed herein are various embodiments of adhesives for use in adhering optical fibers to ferrules within optical connectors, and the methods for use thereof. The various embodiments of adhesives described herein may provide desirable properties, such as, but not limited to, high adhesion strength and/or improved performance following environmental aging. Various embodiments of the adhesives disclosed herein may also have other desirable performance properties for the process of securing an optical fiber within a ferrule, such as, but not limited to, shortened process cycle time, such that a fiber may be secured to a ferrule with a cured adhesive in as little as a few minutes.

Figure 3:
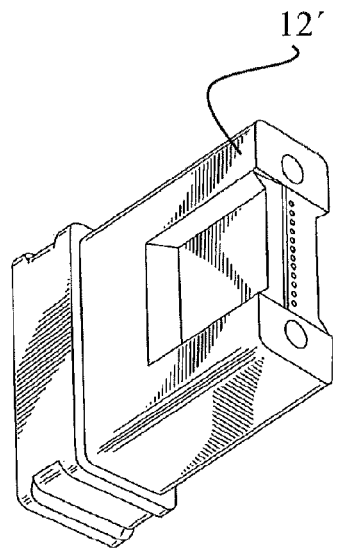
FIG. 3 is a perspective view of a ferrule according to another exemplar embodiment.
Figure 4:
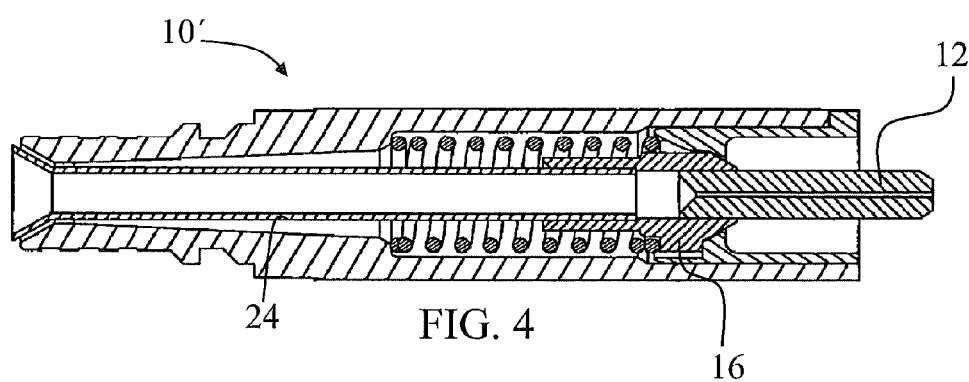
FIG. 4 is a lengthwise cross-sectional view of a connector according to another exemplary embodiment.

Referring to FIG. 1, a conventional field-installable, mechanical splice fiber optic connector 10 suitable for use with the present technology is shown. The fiber optic connector 10 may be a member of the UNICAM® family of mechanical splice connectors available from Corning Cable Systems, LLC of Hickory, N.C. While one embodiment of a fiber optic connector is depicted in FIG. 1, it should be understood that the adhesives and methods for adhering a glass fiber to a ferrule as described herein are applicable to any fiber optic connector of any design. Such fiber optic connectors include, but are not limited to, single fiber (see, e.g., ferrule 12 of connectors 10, 10' as shown in FIGS. 1 and 4) or multi-fiber (see, e.g., ferrule 12' as shown in FIG. 3) connectors, such as fusion splice or mechanical splice connectors. Examples of single fiber mechanical splice connectors are provided in U.S. Pat. Nos. 4,755,018; 4,923,274; 5,040,867; and 5,394,496. Examples of multi-fiber mechanical splice connectors are provided in U.S. Pat. Nos. 6,173,097; 6,379,054; 6,439,780; and 6,816,661.

Figure 2:
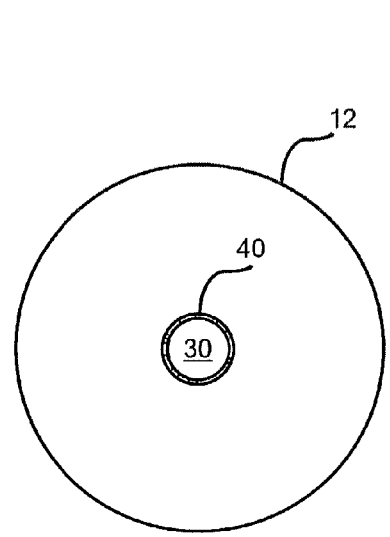
FIG. 2 illustrates a fiber-receiving passage of a connector ferrule.

As is illustrated with further reference to FIG. 2, the mechanical splice connector 10 includes a connector ferrule 12. The fiber-receiving passage 30, which is illustrated in exaggerated scale in FIG. 2 and may be provided in the form of a lengthwise longitudinal bore, defines an inner surface of the ferrule 12, may be contacted with an adhesive 40 to secure an optical fiber 14, such as a stub optical fiber. The adhesive 40 may be disposed within the ferrule 12 and in contact with the inner surface of the ferrule 12 and the optical fiber 14. Various embodiments of the adhesive 40, including variations of adhesives are described in detail herein. In various embodiments, the adhesive 40 may generally comprise an alkyltrialkoxysilane, an aryltrialkoxysilane, and an aryltrifluorosilane, as is described in detail herein.

It is contemplated that the ferrule 12 may comprise a ceramic material, such as, but not limited to, zirconia, alumina, titanium-doped alumina, glass-filled PPS, or combinations thereof. However, other materials of construction of the ferrule are contemplated herein, such as metals, glasses, ceramics, polymers, or combinations thereof.

The optical fiber 14 may be a flexible, transparent optical fiber made of glass, ceramic, plastic, or some combination thereof. It may function as a waveguide to transmit light between the two ends of the optical fiber. Optical fibers may include a transparent core or cores surrounded by a transparent cladding material with a lower index of refraction. Light may be kept in the core by total internal reflection. Glass optical fibers may comprise silica, but some other materials, such as fluorozirconate, fluoroaluminate, and chalcogenide glasses, as well as crystalline materials, such as sapphire, may be used. Although shown as the stub fiber 14 in FIG. 1, in other embodiments optical fibers that are not stub fibers may be included and used in combination with the ferrule 12, 12' and processes disclosed herein.

The light may be guided down the core of the optical fiber 14 by an optical cladding with a lower refractive index that traps light in the core through total internal reflection. The cladding may be coated by a buffer that protects it from moisture and/or physical damage. These coatings may be UV-cured urethane acrylate composite materials applied to the outside of the optical fiber during the drawing process. The coatings may protect the strands of glass fiber. The optical fiber 14 may comprise an inner primary coating and an outer secondary coating. Optical fiber coatings may be applied in concentric layers.

Still referring to FIG. 1, the forward end (also referred to herein as the end face) 11 of the ferrule 12 may be precision polished such that the optical fiber 14 is flush with (as shown), slightly protruding from, or slightly recessed with respect to the end face of the ferrule 12. In contemplated embodiments, the optical fiber 14 protrudes outwardly from the end face 11 of the ferrule 12 a predetermined distance. The end face 11 of the ferrule 12 may be oriented generally perpendicular to the optical-fiber-receiving passage to provide an Ultra Physical Contact (UPC) type connector, or may be formed at a predetermined angle to provide an Angled Physical Contact (APC) type connector, in a known manner. In addition, although a single fiber ferrule 12 is shown for purposes of convenience, the ferrule 12 may define a plurality of lengthwise optical-fiber-receiving passages therethrough for receiving a corresponding plurality of optical fibers to provide a multi-fiber mechanical splice connector. In addition, although a single fiber ferrule 12 is shown for purposes of convenience, the ferrule 12 may define a plurality of lengthwise optical fiber receiving passages therethrough for receiving a corresponding plurality of stub optical fibers to provide a multi-fiber mechanical splice connector or other multi=fiber connector (see generally multi-fiber ferrule 12' as shown in FIG. 3 for a multi-fiber connector).

Generally, in one contemplated embodiment, the rear end 13 of the ferrule 12 is inserted into and secured within the forward end of a ferrule holder 16 so that the optical fiber 14 extends rearwardly a predetermined distance from the ferrule between a pair of opposed splice components 17, 18 disposed within the ferrule holder. In turn, the ferrule holder 16, including the ferrule 12 and splice components 17, 18 is disposed within a connector housing 19. A cam member 20 is movably mounted between the ferrule holder 16 and the connector housing 19 for engaging a keel portion of the lower splice component 18, as will be described. If desired, the ferrule 12, the ferrule holder 16 and the cam member 20 may be biased relative to the connector housing 19, for example by a coil spring 21, to ensure physical contact between the end face 11 of the ferrule 12 and the end face of an opposing ferrule in a mating fiber optic connector or optical device. Finally, a spring retainer 22 may be disposed between the connector housing 19 and a medial portion of the cam member 20 and fixed to the connector housing so as to retain one end of the spring 21 relative to the connector housing. As a result, the ferrule 12, the ferrule holder 16 and the cam member 20 are biased forwardly, yet permitted to piston rearwardly, relative to the connector housing 19.

As illustrated by the horizontal directional arrow in FIG. 1, a field optical fiber 15 may be inserted into the rear end of the ferrule holder 16 opposite the ferrule 12 and the optical fiber 14. Although not required, the mechanical splice connector 10 may be provided with a means, for example a lead-in tube 24 (FIG. 4), for guiding the field optical fiber 15 into the ferrule holder 16 and between the splice components 17, 18 in general alignment with the optical fiber 14. It is contemplated that at least one of the splice components 17, 18 may have a groove formed therein for receiving the optical fiber 14 and the field optical fiber 15. As shown herein, the lower splice component 18 is provided with a lengthwise V-shaped groove for receiving and guiding the optical fiber 14 and the field optical fiber 15 into fine alignment. The field optical fiber 15 may be coated or tight-buffered with a buffer 25 that is stripped back to expose a predetermined length of the end of the field optical fiber. The mechanical splice connector 10 may be further provided with a crimp tube or other strain relief mechanism for retaining and strain relieving the buffer 25 of the field optical fiber 15. With the buffer 25 removed, the field optical fiber 15 can be inserted and advanced into the rear of the mechanical splice connector 10 between the splice components 17, 18 until the end portion of the field optical fiber 15 makes physical contact with the end portion of the optical fiber 14. The cam member 20 is actuated by moving or rotating the cam member 20 relative to the ferrule holder 16 about the longitudinal axis of the connector 10, to engage the keel on the splice component 18 and thereby force the lower splice component 18 in the direction of the upper splice component 17. Movement of the lower splice component 18 causes the end portion of the optical fiber 14 and the end portion of the field optical fiber 15 to seat within the V-shaped groove formed in the lower splice component 18, thereby aligning and simultaneously securing the field optical fiber 15 relative to the optical fiber 14 between the splice components. Accordingly, the field optical fiber 15 is optically coupled to the optical fiber 14. Further, as used herein, the portion of the connector where the optical coupling results is referred to as a "termination area." In other embodiments, the field optical fiber 15 or another optical fiber may be inserted into the ferrule directly, and attached thereto as disclosed herein, in place of the stub fiber 14.

Generally, it should be understood that the adhesives described herein may have application in adhering an optical fiber with any part of an optical connector, and is not limited to the adhesion of a optical fiber to the inner wall of the ferrule. For example, the adhesives described herein may be used to bond any part of an optical connector to any optical fiber connected thereto, including the stub optical fiber and field optical fiber.

Generally, methods for securing optical fibers to optical connectors 10 or ferules of optical connectors 10 are disclosed herein. The methods may comprise the steps of preparing an adhesive mixture, disposing the adhesive mixture in a fiber-receiving passage of the connector, inserting the optical fiber into the fiber-receiving passage and into contact with the adhesive mixture, and curing the adhesive mixture by heating to a temperature of at least about 200° C., followed by cooling to room temperature or below. Various embodiments of adhesives are disclosed herein. As used herein, an "adhesive" is a substance capable of holding materials together by surface attachment. An "adhesive mixture" may require a curing process to gain or enhance its adhesive properties.

Adhesive mixtures contemplated herein may be prepared by forming a base mixture comprising at least a base solvent, an alkyltrialkoxysilane, an aryltrialkoxysilane, and an aryltrifluorosilane. Adhesive mixtures provided herein are represented by molar percentages of the alkyltrialkoxysilane, the aryltrialkoxysilane, and the aryltrifluorosilane combined with a molar percent superaddition of the solvent. As used herein, alkyltrialkoxysilanes are silicon atoms having three alkoxy groups and one alkyl group bonded thereto. Alkyl is also meant to include arylalkyls. Alkyltrialkoxysilanes suitable for use in the practice of the present adhesive include, for example, methyltrimethoxysilane ("MTMS") and methyltriethoxysilane ("MTES"). In one embodiment, the adhesive mixture comprises greater than or equal to about 20% and less than or equal to about 100% alkyltrialkoxysilanes. In another embodiment, the adhesive mixture comprises greater than or equal to about 40% and less than or equal to about 70% alkyltrialkoxysilanes. In yet another embodiment, the adhesive mixture comprises greater than or equal to about 50% and less than or equal to about 52% alkyltrialkoxysilanes. As used herein, aryltrialkoxysilanes are silicon atoms having three alkoxy groups and one aryl group bonded thereto. As used herein, aryl also is meant to include alkylaryl moieties. Aryltrialkoxysilanes suitable for use in the practice of the present adhesive include, for example, phenyltrimethoxysilane ("PTMS") and phenyltriethoxysilane ("PTES"). In one embodiment, the adhesive mixture comprises greater than or equal to about 0% and less than or equal to about 80% aryltrialkoxysilanes. In another embodiment, the adhesive mixture comprises greater than or equal to about 20% and less than or equal to about 60% aryltrialkoxysilanes. In yet another embodiment, the adhesive mixture comprises greater than or equal to about 35% and less than or equal to about 39% aryltrialkoxysilanes. Aryltrifluorosilanes may include molecules such as phenyltrifluorosilane ("PTFS"). In one embodiment, the adhesive mixture comprises greater than or equal to about 0% and less than or equal to about 15% aryltrifluorosilanes. In another embodiment, the adhesive mixture comprises greater than or equal to about 4% and less than or equal to about 10% aryltrifluorosilanes. In yet another embodiment, the adhesive mixture comprises greater than or equal to about 7% and less than or equal to about 9% aryltrifluorosilanes. As used herein, a base solvent may include water in combination with any miscible organic solvent, such as but not limited to, methanol or ethanol, or combinations thereof. In one embodiment, the amount of water added to the adhesive mixture comprises a superaddition of greater than or equal to about 10% and less than or equal to about 200% relative to the total moles of alkyltrialkoxysilane, aryltrialkoxysilane, and aryltrifluorosilane in the adhesive. In another embodiment, the amount of water added to the adhesive mixture comprises a superaddition of greater than or equal to about 30% and less than or equal to about 100% relative to the total moles of alkyltrialkoxysilane, aryltrialkoxysilane, and aryltrifluorosilane in the adhesive. In yet another embodiment, the amount of water added to the adhesive mixture comprises a superaddition of greater than or equal to about 50% and less than or equal to about 60% relative to the total moles of alkyltrialkoxysilane, aryltrialkoxysilane, and aryltrifluorosilane in the adhesive. Small additions of organic solvents, such as, for example, up to about 10% by volume in the water can be included in the formulation to accelerate dissolution of the components.

In one embodiment, the base mixture may optionally further comprise a tetra-alcoxysilicate, such as, but not limited to, tetraethyl orthosilicate ("TEOS"), tetramethyl orthosilicate ("TMOS"), or combinations thereof. The various components of the base mixture may be well mixed such as to form a sol phase mixture. Tetra-alcoxysilicate may enhance the adhesion strength of the adhesive mixture to the glass fiber. In one embodiment, the adhesive mixture comprises greater than or equal to about 0% and less than or equal to about 10% tetra-alcoxysilicate. In another embodiment, the adhesive mixture comprises greater than or equal to about 2% and less than or equal to about 5% tetra-alcoxysilicate. In another embodiment, the base mixture may optionally further comprise poly(dimethylsiloxane). It is contemplated, however, that the adhesion mixture need not contain poly(dimethylsiloxane) because the addition of poly(dimethylsiloxane) may produce a flexible adhesive which may not have as strong of adhesion strength as an adhesive not containing poly(dimethylsiloxane). In one embodiment, the adhesive mixture comprises greater than or equal to about 0% and less than or equal to about 10% poly(dimethylsiloxane). However, in an exemplary embodiment, the adhesive mixture does comprises poly(dimethylsiloxane). In another embodiment, the base mixture may optionally further comprise colloidal silica nanoparticles (e.g., nominal size 10 nm particles). The addition of colloidal silica nanoparticles may increase the viscosity and break up the network structure of the sol. In one embodiment, the adhesive mixture comprises greater than or equal to about 0.1% and less than or equal to about 10% colloidal silica nanoparticles. In another embodiment, the adhesive mixture comprises greater than or equal to about 4% and less than or equal to about 6% colloidal silica nanoparticles.

The base mixture may be used as the adhesive that binds the optical fiber to the ferrule or another component of the optical connector. However, in some embodiments, the base mixture may be further reacted to form a resin, and then be reconstituted to again form an adhesive. To form the resin, the base mixture may be heated for a time and to a temperature sufficient to homogenize the base mixture to form a reacted mixture. Prior to heating, the base mixture may be an emulsion.

As the base mixture is heated, the water component of the base mixture reacts with the alkoxide groups on the various precursors, forming silicon hydroxides, and releasing the corresponding alcohol. As the reaction proceeds, the base mixture (an emulsion) forms a reacted solution (an emulsion) which contains a product alcohol. For example, the base mixture may be heated in a water bath at temperatures of about 70° C. for about 1, 2, 3 or even 5 hours to enable the reaction. Stirring during the heating may also promote the reaction. The reacted mixture, now a solution, may be further treated by evaporating the reaction product alcohol to leave a resin that has a mass of about 60% to 90% of the reacted mixture weight, and in one embodiment, 70% to 80% of the reacted mixture weight. The drying process may improve the cure characteristics, enabling faster process times, and reducing bubble formation. In some embodiments, the resin may be stored under refrigeration for up to about 2 weeks or more. The dried resin mixture may then be reconstituted with a reconstituting solvent, such as isopropanol, to again form a low viscosity adhesive mixture. The reconstitution process may improve the consistency of the adhesive mixture.

In one embodiment, the base mixture may consist essentially of one or more base solvents, an alkyltrialkoxysilane, an aryltrialkoxysilane, and an aryltrifluorosilanes. In another embodiment, the base mixture may consist essentially of water with one or more base solvents, an alkyltrialkoxysilane, an aryltrialkoxysilanes, an aryltrifluorosilanes, and tetraethyl orthosilicate. In yet another embodiment, the base mixture may comprise methyltriethoxysilane, phenyltriethoxysilane, phenyltrifluorosilane, and deionized water. In a further embodiment, the base mixture may comprise methyltriethoxysilane, phenyltriethoxysilane, phenyltrifluorosilane, deionized water, and tetraethyl orthosilicate.

Once the adhesive mixture is prepared, the adhesive mixture is disposed in the fiber-receiving passage. For example, the adhesive mixture may be loaded into a syringe and inserted into the fiber-receiving passage. Following the adhesive mixture being disposed in the fiber receiving passage, the fiber may be inserted into the fiber-receiving passage and into contact with the adhesive mixture. At this point, the adhesive mixture may be allowed to dry, or may be immediately exposed to a curing environment at elevated temperatures.

In one embodiment, prior to the fiber being inserted into the fiber receiving passage and into contact with the adhesive mixture, the fiber may be pretreated by an acid treatment. For example, the fiber may be dip coated with acid (e.g., 0.01M HCl) prior to being inserted into the fiber receiving passage. In another embodiment, prior to the fiber being inserted and being brought into contact with the adhesive mixture, the fiber may be pretreated by an oxygen plasma treatment. For example, the fiber may be oxygen plasma treated (e.g., for about 3 minutes) prior to being inserted into the fiber receiving passage. In another embodiment, prior to the fiber being inserted into the fiber receiving passage and into contact with the adhesive mixture, the fiber may be optionally coated with tetraethyl orthosilicate prior to being inserted into the fiber-receiving passage and into contact with the adhesive. The area of the optical fiber that makes contact with the adhesive mixture may be at least partially coated with tetraethyl orthosilicate. For example, the fiber may be dip coated with tetraethyl orthosilicate prior to being inserted into the fiber receiving passage. In one embodiment, the fiber, prior to insertion in the fiber receiving passage, may undergo multiple pretreatment steps, such as the oxygen plasma treatment, the acid treatment, and/or the tetraethyl orthosilicate coating.

The adhesive mixture may be cured by heating to a temperature of at least about 200° C. and cooling the adhesive mixture to room temperature or below. For example, the adhesive mixture may be heated to a temperature of at least about 200° C., at least about 300° C., or even at least about 350° C. Heating may be performed by a laser, or any other heating process. The heating step may take less than about 15 seconds with a laser, such as even less than 10 seconds, less than 8 seconds, or less than 6 seconds. The adhesive mixture may then be allowed to cool by any process, such as by accelerated cooling or through simple cooling in an ambient atmosphere at or near room temperature or below. The cooled adhesive mixture is set and may stably adhere the optical fiber to the ferrule. In some embodiments, the ferrule and adhesive may substantially cool as to set the adhesive within about 5 minutes, about 2 minutes, about 1 minute, about 30 seconds, or even about 15 seconds. In some embodiments, the adhesive mixture may undergo a pre-curing process, such as a heat treatment to a temperature of at least about 100° C., at least about 125° C., or even at least about 150° C. The pre-curing may dry and partially cross-link the adhesive to allow for transport.

It should be understood that various components of the adhesive embodiments disclosed herein may be combined in any combination in any ratio disclosed herein. Such various components include, but are not limited to, alkyltrialkoxysilanes, aryltrialkoxysilanes, and aryltrifluorosilanes. Furthermore, while desirable properties of the adhesive may be caused by the combination of only two or more of the various components, any combination of the components is contemplated herein. It should further be understood that where a component of the adhesive is referenced, it may be an optional component is some embodiments, and is not required to be in the adhesive is all embodiments.

The optical connectors, once cured, may comprise a fiber-receiving passage defining an inner surface, an optical fiber, and an adhesive disposed within the fiber receiving passage and in contact with the inner surface of the fiber receiving passage and the optical fiber. The adhesive may comprise a cured alkyltrialkoxysilane, a cured aryltrialkoxysilane, and a cured aryltrifluorosilane. In other embodiments, the adhesive may further comprise cured tetraethyl orthosilicate. If a tetraethyl orthosilicate pretreatment was applied to the fiber, the optical connector may comprise a cured tetraethyl orthosilicate layer disposed between the fiber and the adhesive composition. In one embodiment, the adhesive may consist essentially of a cured alkyltrialkoxysilane, a cured aryltrialkoxysilane, and a cured aryltrifluorosilane.

Example

The adhesive mixture was prepared by adding 6.62 cc methyltriethoxysilane, 6.72 cc phenyltriethoxysilane, 0.73 cc phenyltrifluorosilane, and 1.4 cc de-ionized water to a plastic conical tube and the tube is capped. The mixture was heated in a 70° C. water bath for about 1 hour, with intermittent mixing until the water was completely emulsified (solution turns clear). The water bath was further continuously heated for a total of 5 hours. Once the solution was fully emulsified, the sol was concentrated (about 4 grams weight loss) to a viscous resin and then was reconstituted with an equivalent weight of isopropanol. Fully reconstituting the resin with isopropanol is not required and controlling the percentage of alcohol in the adhesive mixture can control the presence of voids in the adhesive bond. This can be desirable to achieve optimum bond strength between the fiber and the ferrule.

The ferrules were prepared for bonding by plasma cleaning them in a plasma chamber using oxygen or high purity air. The chamber was cycled through a 3 minute cleaning cycle first then the ferrules were loaded into the plasma chamber. Once the vacuum was reached the plasma was generated and maintained for three minutes. Ferrules were bonded within 30 minutes of being plasma treated. The adhesive mixture was loaded into a syringe for use in an automatic dispensing machine. Settings of 22 psi, 0.13 seconds and 30 gage tip were used to fill the ferrules. Ferrules were held horizontally in an alligator clip and the adhesive mixture was dispensed into the ferrule. The cleaned and pre-treated fiber was then inserted manually into the ferrule. The assembly was then placed onto an aluminum foil so it could be transferred to an oven for pre-cure. If the fiber was pre-treated (acid dip or tetraethyl orthosilicate dip), the fiber was simply dipped into a beaker of solution, taking care not to touch the fiber to the beaker sides or bottom and held there for 10 seconds before inserting it into the ferrule. Once a set of 12 fiber/ferrule assemblies were been completed, the aluminum foil was folded over the fiber tails and the assemblies were placed in a pre-heated oven at 150° C. for 1 hour to pre-cure the assemblies. The assemblies were then subjected to laser curing for 10 seconds at a nominal 350° C. Similar samples were prepared with no pre-cure heating step, which showed similar bond strength.

For the purposes of describing and defining the present disclosure it is noted that the term "about" are utilized herein to represent the inherent degree of uncertainty that may be attributed to any quantitative comparison, value, measurement, or other representation. The term "about" are also utilized herein to represent the degree by which a quantitative representation may vary from a stated reference without resulting in a change in the basic function of the subject matter at issue.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated herein.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Rather, the claims appended hereto should be taken as the sole representation of the breadth of the present disclosure and the corresponding scope of the various embodiments described herein. Further, it will be apparent that modifications and variations are possible without departing from the scope of the appended claims.

The invention claimed is:

1. A method for securing an optical fiber to a ferrule of an optical connector, the method comprising:
   preparing an adhesive mixture, wherein preparing the adhesive mixture comprises forming a base mixture comprising a base solvent, an alkyltrialkoxysilane, an aryltrialkoxysilane, and an aryltrifluorosilane;
   disposing the adhesive mixture in a fiber-receiving passage defining an inner surface of the ferrule;
   inserting the optical fiber into the fiber-receiving passage and into contact with the adhesive mixture; and
   curing the adhesive mixture by heating to a temperature of at least about 200° C. and cooling the adhesive mixture to room temperature or below.

2. The method of claim 1, wherein preparing the adhesive mixture further comprises:
   heating the base mixture to form a reacted mixture comprising an alcohol;
   evaporating at least a portion of the alcohol in the reacted mixture to form a resin; and
   mixing a reconstituting solvent with the resin to reconstitute the resin into an adhesive mixture.

3. The method of claim 2, wherein the reconstituting solvent comprises isopropanol.

4. The method of claim 1, wherein the curing of the adhesive mixture comprises heating the adhesive mixture to at least about 200° C. in less than about 15 seconds and by cooling the adhesive mixture to room temperature or below in less than about 5 minutes.

5. The method of claim 1, wherein the curing of the adhesive mixture comprises heating the adhesive mixture by a laser.

6. The method of claim 1, further comprising pretreating the ferrule with an acid treatment or an oxygen plasma treatment, or both, prior to disposing the adhesive mixture in the fiber receiving passage of the ferrule.

7. The method of claim 1, further comprising at least partially coating an area of the optical fiber that makes contact with the adhesive mixture with tetraethyl orthosilicate.

8. The method of claim 1, wherein the base mixture further comprises tetraethyl orthosilicate.

9. The method of claim 1, wherein the base mixture consists essentially of the alkyltrialkoxysilane, the aryltrialkoxysilane, the aryltrifluorosilane, and one or more base solvents.

10. The method of claim 1, wherein the base mixture consists essentially of one or more base solvents, the alkyltrialkoxysilane, the aryltrialkoxysilane, the aryltrifluorosilane, and tetraethyl orthosilicate.

11. A method for preparing an adhesive, the method comprising:
   forming a base mixture comprising a base solvent, an alkyltrialkoxysilane, an aryltrialkoxysilane, and an aryltrifluorosilane;
   heating the base mixture to form a reacted mixture comprising an alcohol;
   evaporating at least a portion of the alcohol in the reacted mixture to form a resin; and
   mixing a reconstituting solvent with the resin to reconstitute the resin into an adhesive mixture; and
   curing the adhesive mixture by heating to a temperature of at least about 200° C. and cooling the adhesive mixture to room temperature or below.

12. The method of claim 11, wherein the base mixture further comprises tetraethyl orthosilicate.

13. The method of claim 11, wherein the base mixture consists essentially of the alkyltrialkoxysilane, the aryltrialkoxysilane, the aryltrifluorosilane, and one or more base solvents.

14. The method of claim 13, wherein the base solvent comprises deionized water.

15. The method of claim 11, wherein the base mixture consists essentially of the alkyltrialkoxysilane, the aryltrialkoxysilane, the aryltrifluorosilane, tetraethyl orthosilicate, and one or more base solvents.

16. The method of claim 15, wherein the base solvent comprises deionized water.

17. An optical connector for terminating an optical fiber, the optical connector comprising a ferrule, the optical fiber, and an adhesive, wherein:
- the ferrule comprises a fiber-receiving passage defining an inner surface;
- the adhesive is disposed within the ferrule and in contact with the inner surface of the ferrule and the optical fiber; and
- the adhesive comprises a cured alkyltrialkoxysilane, a cured aryltrialkoxysilane, and a cured aryltrifluoro silane.

18. The optical connector of claim 17, wherein the adhesive further comprises cured tetraethyl orthosilicate or the optical connector comprises a cured tetraethyl orthosilicate layer disposed between the optical fiber and the adhesive.

19. The optical connector of claim 17, wherein the adhesive comprises a cured sol mixture.

20. An optical connector for terminating an optical fiber, the optical connector comprising a fiber receiving passage, the optical fiber, and an adhesive, wherein:
- the fiber-receiving passage defines an inner surface;
- the adhesive is disposed within the fiber receiving passage and in contact with the inner surface of the fiber receiving passage and the optical fiber; and
- the adhesive comprises a cured alkyltrialkoxysilane, a cured aryltrialkoxysilane, and a cured aryltrifluoro silane.

* * * * *